Figure 5:
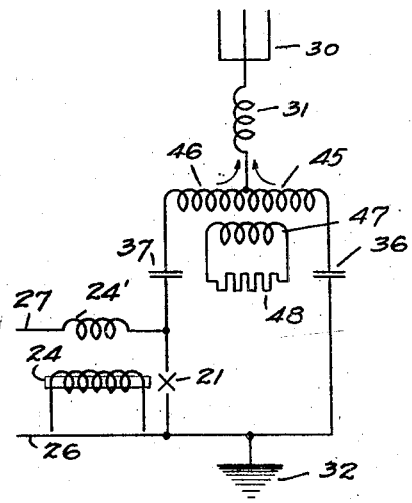

Feb. 23, 1926.
H. F. ELLIOTT ET AL
1,574,473
RADIOFREQUENCY SYSTEM
Filed Jan. 9, 1922     3 Sheets-Sheet 1
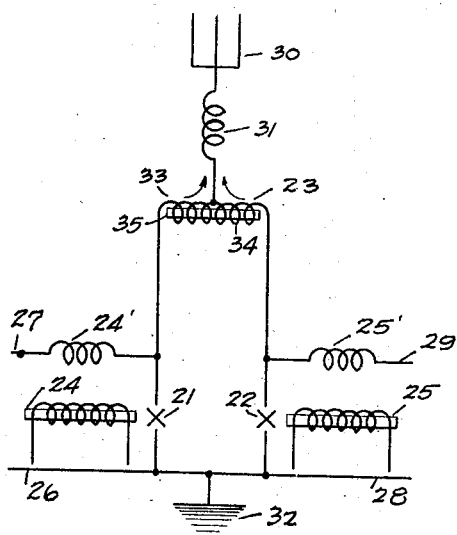
Fig. 1.
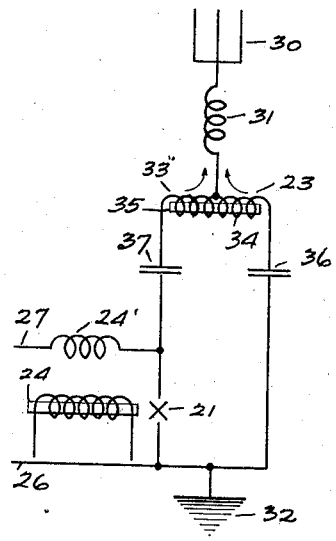
Fig. 2.
Fig. 3.
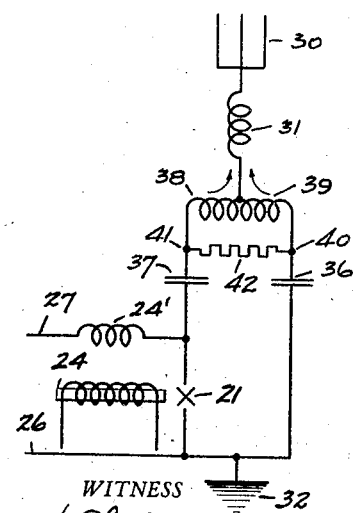
WITNESS
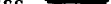
Fig. 4.
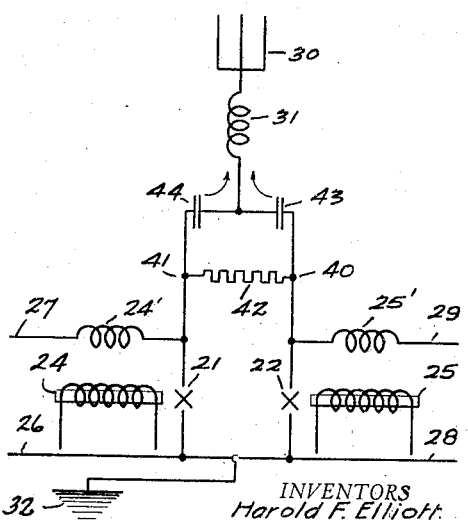
INVENTORS
Harold F. Elliott
James A. Miller
BY
ATTORNEYS Feb. 23, 1926. 1,574,473
H. F. ELLIOTT ET AL
RADIOFREQUENCY SYSTEM
Filed Jan. 9, 1922    3 Sheets-Sheet 2

WITNESS
H. Sherburne

INVENTORS
Harold F. Elliott.
James A. Miller.
BY
White Prost Evans
their ATTORNEYS Feb. 23, 1926.
H. F. ELLIOTT ET AL
1,574,473
RADIOFREQUENCY SYSTEM
Filed Jan. 9, 1922   3 Sheets-Sheet 3.
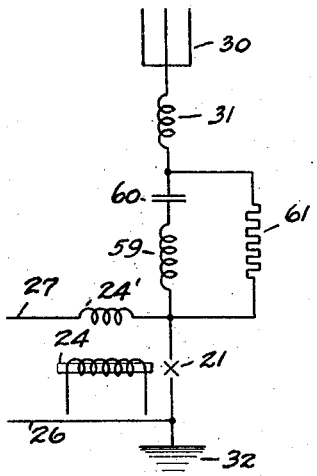
FIG. 9.
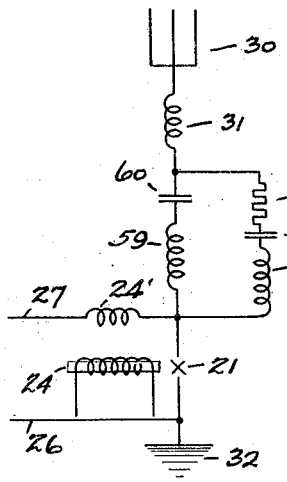
FIG. 10.
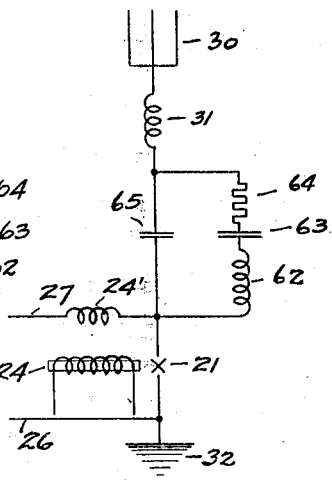
FIG. 11.
FIG. 12.
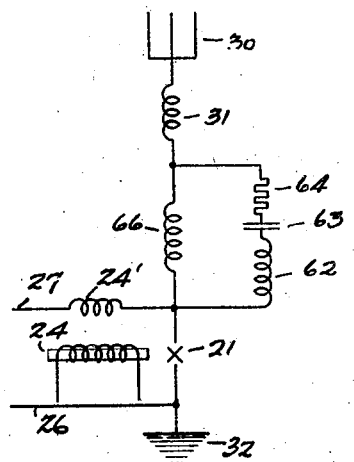
FIG. 13.
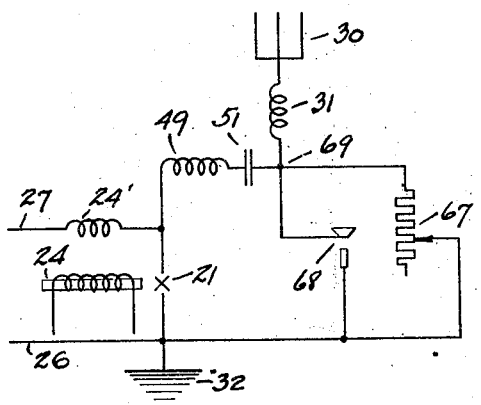
FIG. 14.
WITNESS
H. Sherburne
INVENTORS
Harold F. Elliott
James A. Miller
BY
White Prost & Evans
their ATTORNEYS Patented Feb. 23, 1926.

1,574,473

UNITED STATES PATENT OFFICE.

HAROLD F. ELLIOTT AND JAMES ARTHUR MILLER, OF PALO ALTO, CALIFORNIA, ASSIGNORS, BY MESNE ASSIGNMENTS, TO FEDERAL TELEGRAPH COMPANY, OF SAN FRANCISCO, CALIFORNIA, A CORPORATION OF CALIFORNIA.

RADIOFREQUENCY SYSTEM.

Application filed January 9, 1922. Serial No. 527,885.

*To all whom it may concern:*

Be it known that we, HAROLD F. ELLIOTT and JAMES ARTHUR MILLER, citizens of the United States, and residents of Palo Alto, county of Santa Clara, and State of California, have invented a certain new and useful Radiofrequency System, of which the following is a specification.

This invention relates to a radio frequency system; especially to a converter of electrical energy either in the form of direct current or low frequency current, into radio frequency currents suitable for the transmission of radio signals; and more particularly to a device known as an arc converter, which, when placed into a circuit having inductance and capacity, produces electric oscillations therein of a high order of frequency. Such arc converters, particularly the Poulsen arc converter, are now well known, and operate quite successfully under ordinary conditions of service. It is sometimes necessary, or at least more efficient, to arrange the arc or other source of oscillations in but one of several parallel paths or branch circuits all leading to the main load; in the case of radio signaling, to the antenna circuit. The paths in parallel to the arc path may include other sources, such as arcs, to increase the maximum load that the installation can carry, or one of the paths may include a condenser or its equivalent so as to increase the efficiency of the arc producing the high frequency oscillations. The latter scheme is described in a patent granted to Leonard F. Fuller, Reissue 14,760, reissued November 25, 1919, entitled Wireless telegraphy. Also, it is frequently desirable to employ other special forms of coupled circuits or other circuits upon which the operation of the arc is ordinarily unstable. Such circuits are employed for parallel operation, for increasing the arc efficiency, for filtering undesired harmonics, for multiplex operation, etc., as described in this and two other applications filed concurrently herewith in our names, each entiled Radio frequency system, Serial No. 527,884 and No. 527,886.

In installations of the type mentioned, difficulties are sometimes likely to occur, due to the inherent instability of the arc. Thus, cross currents between the parallel paths may be set up, during which time only a portion of the arc current would reach the load. Again, the circuits may be such as to cause variations in the frequency at which the arc operates. It is one of the objects of our invention to obviate such occurrences, and to keep the operation of the arc stable. Another object of our invention is to render it possible to operate arcs in parallel and thus to increase the range of the radiating circuit.

The invention possesses other advantageous features, some of which, with the foregoing, will be set forth at length in the following description, where there will be outlined in full those forms of the invention which we have selected for illustration in the drawings accompanying and forming part of the present specification. In the drawings are shown several embodiments of our invention, but it is to be understood that we do not limit ourselves to such forms, since the invention as expressed in the claims may be embodied in other forms as well.

Referring to the drawings:

Figure 1 indicates a wiring arrangement for stabilizing two arc circuits or paths which are in parallel.

Fig. 2 indicates a wiring arrangement for stabilizing an arc circuit and an auxiliary branch circuit that increases the efficiency of the arc.

Fig. 3 indicates a wiring arrangement of a modified form of stabilizer for an arc circuit and its auxiliary parallel circuit.

Figure 6:
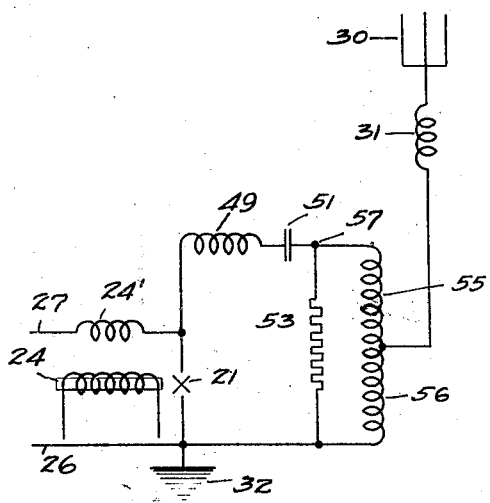

Figs. 4, 5 and 6 indicate further modifications.

Figure 7:
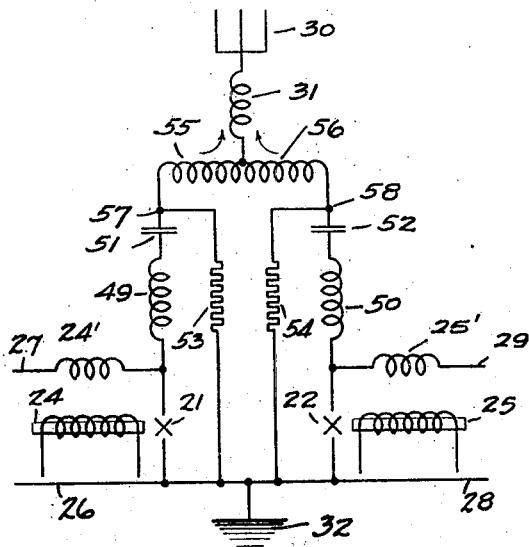

Fig. 7 indicates a wiring arrangement for stabilizing two parallel arc circuits, both for preventing cross currents and for confining the operation of the system to a definite frequency.

Figs. 8, 9, 10, 11, 12 and 14 show modified forms for stabilizing a circuit in order to insure operation at the desired frequency, and Fig. 13 shows a diagram of a radio frequency system provided with means for sending signals and for insuring operation at the desired frequency.

Referring now more in detail to the drawings, a pair of arcs 21, 22 or other sources of high frequency oscillations, in Fig. 1, are made to operate in parallel to supply an antenna circuit. At the junction of the two parallel circuits is located the stabilizing device 23. The usual means, such as electromagnets 24 and 25, are provided for influencing the arcs in the well known manner. Choke coils 24' and 25' may also be provided in the circuit. Leads 26, 27, 28 and 29 are adapted to be connected with either a direct current source or a low frequency source.

The stabilizing device 23 serves to prevent cross currents between the parallel arc circuits, and thus to insure that the antenna circuit comprising antenna 30, inductance 31 and the ground 32, receives all of the current from both arcs 21 and 22. It is possible to accomplish this result due to the preference of the arc to operate on a path in which there is the minimum energy loss. In the form shown in Fig. 1 advantage is taken of this property, and there are provided, in the device 23, two inductance coils 33 and 34, respectively in the circuit of arc 21, and in the circuit of arc 22. These coils are so disposed as to have as great mutual induction as possible. The antenna circuit is connected midway between the two coils. There is also provided a common iron core 35 for both coils. The direction of winding and number of turns of these coils are such that when the currents from the arcs 21 and 22 flow in the proper direction as indicated by the full arrows, then the magnetizing forces of the two coils neutralize each other, and the iron core 35 carries but a small amount of magnetic flux. Should a portion of the current from one of the arcs be shunted off through the other without passing through the load circuit, that is, should the arcs tend to operate in series, then this balance is destroyed, and the core 35 carries a much greater amount of flux. Since this flux reverses as often as the frequency of the circuit, which is very high, a greatly increased core loss results. The arc currents would then be operating on a circuit having greater losses. This they inherently avoid, so that the result is the maintenance of the former condition of operation. Harmonics are also suppressed by this device.

Thus the stabilizing device 23 keeps the arcs operating properly in parallel. The same scheme of control is suitable with any form of high frequency circuit, whether the oscillations be produced by two or more arcs or otherwise.

While Fig. 1 illustrates the use of a stabilizing device for two or more sources of high frequency oscillations in parallel, it is possible to use a similar device in a system employing but one source, but in which there is more than one path for the current that finally flows through the load circuit. Such a system is illustrated in Fig. 2, in which two branch circuits including condensers 36 and 37 serve the purpose of increasing the efficiency of the arc in a manner analogous to that described in the Fuller patent mentioned hereinbefore. The stabilizing device 23 operates substantially as in the modification of Fig. 1, and prevents the series operation of the arc on the condensers 37 and 36. Harmonics, as well as cross currents, are also prevented. The other elements of the system are identical with those of Fig. 1.

In Fig. 3 a modified form of stabilizer is shown in connection with a circuit analogous to that of Fig. 2. The condensers 36 and 37 are similarly located. A pair of air cored coils 38 and 39 are located at the junction of the branch circuits with the antenna circuit. These coils are so arranged that for the desired condition of operation, the terminals 40 and 41 are at substantially the same potential. If, however, any cross current should pass through condenser 36, then the balance is destroyed and an appreciable potential difference between points 40 and 41 would result, and thus an energy loss in the resistor 42 connected between these two points. The tendency would then be to operate under the desired condition, that of resulting in the passage of all the arc current through the useful load.

An analogous scheme to that just described is illustrated in Fig. 4. In this case, two arcs 21 and 22 are operated in parallel, as in Fig. 1. Instead of the inductance coils, however, use is made of a pair of condensers 43, 44 located in the branch circuits, and so proportioned that when all of the current from each branch circuit passes through the antenna 30, then the points 40 and 41 are equipotential points. For any other condition the resistance 42 is supplied with current. It is evident that any other form of impedances or combinations of them may be substituted for the coils 38, 39 or condensers 43, 44, so long as they are so proportioned that the equipotential points 40 and 41 may be located. The particular combination used may be dependent upon the physical and electrical characteristics of the system taken as a whole.

The stabilizing device may take still other forms, such for example as that shown in Fig. 5. In this figure there is shown a system analogous to that of Fig. 2, there being branched circuits in which are located the condensers 36 and 37. The stabilizer comprises a pair of air-cored coils 45 and 46 located in the circuit as the coils 38 and 39 of Fig. 3. These coils are both in inductive relation with a third air-cored coil 47, which may be termed the secondary of the transformer of which coils 45 and 46 are the primary. The coils 45 and 46 are so arranged and constructed that they are opposed and balanced while the paths of the arc currents are those indicated by the full arrows. Thus, substantially no E. M. F. is induced in the secondary coils 47 unless an unbalancing takes place, or in other words, when some portion of the arc currents forms a cross current between the two branch circuits or paths. When this occurs, the resistance 48 carries a current, which occasions an energy loss.

In all of the schemes thus far described, the stabilizing of the system consisted in confining the arc currents to definite paths. Sometimes difficulty is also experienced in confining the operation of the arc to a definite frequency. This may be remedied in a manner which may be explained in connection with Fig. 6. The scheme is shown as applied to a circuit in which there are two paths between a single arc 21 and the load or antenna circuit 30, 31, 32, in order to increase the arc efficiency. In one of the paths is located an inductance coil 49, a condenser 51, and an air-cored transformer coil 55. The other path includes the transformer coil 56, which, with coil 55, forms an autotransformer. These two coils are wound in the same direction to effect this result. The coil 49 and condenser 51 are so adjusted that their reactances neutralize each other at the frequency which it is desired to use. Thus for this condition of operation, a minimum potential difference is obtained across the arc 21, coil 49, and condenser 51 in series up to point 57. A resistance 53 is arranged to be in parallel to this portion of the circuit, its value being so chosen that an appreciable energy loss is obtained should the potential difference across it deviate substantially from the desired minimum value, occasioned by a substantial change in the frequency. The restriction to a definite frequency is of importance in the circuit shown in this figure, since, as may be proven mathematically, the system has a tendency to operate naturally at either of two isolated frequencies. This is due to the close coupled transformer action described in greater detail in one of the copending applications, Serial No. 527,886, hereinbefore identified. In brief, however, this transformer action may be described as follows: A primary transformer circuit consists of arc 21, coil 49, condenser 51 and coils 55 and 56. The secondary circuit consists of coil 56 and the antenna elements. It is thus seen that the coils 55 and 56 constitute an autotransformer, although a conventional type of transformer may be used in place of it. The ratio of transformation may be fixed at the right value so that the arc is made to operate under efficient conditions, the ratio of voltage to current of the arc being increased.

Fig. 7 shows another type of circuit in which a restriction to a definite frequency is applied. In this figure the arcs 21 and 22 are paralleled, and supply the antenna 30. In series with each arc is an inductive coil 49 or 50, as well as a condenser 51 or 52. The constants of these condensers and coils are so chosen that at the desired frequency of operation, the combined reactances of the coil 49 and condenser 51 is zero; in other words, this circuit is tuned to the required frequency. The same condition is adhered to with respect to the combined reactances of coil 50 and condenser 52. In this way, the resistors 53, 54 paralleling the arc, coil and condenser, have a minimum potential difference across them at the desired frequency of operation. For a variation from this frequency, the difference of potential increases, and with it the energy loss in the resistor 53 or 54. The branch circuits also include inductive coils 55, 56 which are opposed and so arranged adjacent the junction point of the two paths, that the points 57, 58 are equipotential while there are no cross currents between the arcs. In case there is a cross current, an energy loss occurs in the combined resistor 53, 54, which parallels the two coils 55, 56. Thus, the resistors 53 and 54 are used for dissipating energy due to a variation from the desired frequency as well as to a variation from the desired path of any arc current.

Figure 8:
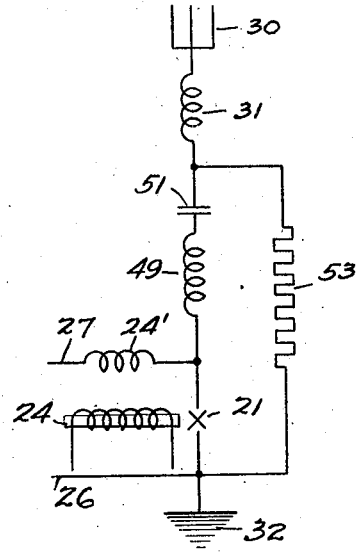

A simple system in which the only restriction is that imposed on the frequency is shown in Fig. 8. Here there is but one arc circuit. The resistor 53 shunts the resonant circuit consisting of arc 21, coil 49, and condenser 51. Upon a variation from the desired frequency, an increased potential difference is impressed on the resistor 53, which results in an increased energy loss therein.

It is not essential that the resistor bridge the arc as well as the other elements of the circuit. It is possible to construct the coil and condenser so as to make the combination of the two alone resonant to the desired frequency. The resistor may then be connected as shown in Fig. 9. The coil 59 and condenser 60 have a minimum potential drop at the required frequency. The resistor 61 is responsive to this potential difference, since it is directly connected across the coil 59 and condenser 60.

In Fig. 10 the control is substantially that of Fig. 9, with the variation that a circuit comprising the inductance 62, capacitance 63 and resistance 64 is shunted across the coil 59 and condenser 60. The values of the impedances of the elements 62, 63 and 64 may be chosen so as to give the best results for the particular system in which this scheme is utilized.

It is not necessary that a resonant circuit be shunted. For example, in Fig. 11 a condenser 65 is shunted by a parallel path similar to that last described. In this case, for a decreasing frequency from that required, the drop across the condenser increases. Thus, this scheme checks any attempt of the frequency to decrease. The contrary effect is obtained with the system shown in Fig. 12, where an inductance 66 is shunted. Here an increased frequency causes an increased potential drop.

The type of circuit shown in Figs. 8 and 9 are also useful for damping out higher harmonics in the system and to by-pass them. The same effect is obtained in the system shown in Fig. 13 where the inductive coil 49 and condenser 51 are again so chosen that their reactances are neutralized. The resistor 67 by-passes and suppresses higher harmonics, and also restricts the frequency to the desired value. The value of the resistor 53 must be carefully chosen; if too great, it is not so effective for damping out the harmonics, while if too low, it may by-pass an objectionable amount of useful current. The adjustment may be easily effected, however, with the aid of the proper measuring instruments. A sending key 68 connected between the point 69 and ground is also shown. The fact that the harmonics are eliminated makes the operation of the sending key much better as regards sparking.

Another scheme for eliminating harmonics and for stabilizing the system at a definite frequency is shown in Fig. 14. In this case the resonant circuit 21, 49, 51 is bridged by the resistance 72, and the condenser 71 and inductor 70 arranged in parallel. The condenser 71 and inductor 70 are so tuned that when an E. M. F. is impressed upon them at the frequency which it is desired to use, the current through inductor 70 is exactly equal and opposite in phase to the current through condenser 71, with the result that no current at this frequency can flow through the lead 73 or resistor 72. Thus, for operation at the correct frequency there is no energy loss in the resistor 72; but for other frequencies, an energy loss results, since the currents in the two branches 70, 71 no longer neutralize each other. Harmonics are also effectively by-passed.

We claim:

1. In a radio frequency electrical system, in which there are a plurality of parallel paths, means for producing high frequency oscillations, and means for maintaining the operation of the system stable comprising a circuit, a portion of which is included in one of the parallel paths, and another portion in another of the parallel paths, both of said portions including an energy consuming device, whereby during unstable operation of the system this circuit is active to cause an increased energy loss in the system.

2. In a radio frequency electrical system in which there are a plurality of parallel paths, means for producing high frequency oscillations by an arc located in one of the parallel paths, and means for stabilizing the operation of the arc comprising a circuit a portion of which is included in one of the parallel paths, and another portion in another of the parallel paths, both of said portions including an energy consuming device, whereby during unstable operation of the arc this circuit is active to cause an increased energy loss in the system.

3. In a radio frequency electrical system, a plurality of high frequency sources arranged in parallel, and means for stabilizing the operation of the system, comprising a resistor, separate portions of said resistor paralleling each of the sources, and the entire resistor connecting points in the two source paths.

4. In a radio frequency electrical system having a plurality of parallel paths for the current flowing through the load, means for producing high frequency oscillations by an arc located in one of the paths, a reactance in each of the parallel paths so arranged that it permits a substantial energy loss when not substantially all of the arc current flows through the load.

5. In a radio frequency electrical system having a plurality of parallel paths for the current flowing through the load, means for producing high frequency oscillations by an arc located in one of the paths, an induction coil in the same path as the arc, another induction coil in a path parallel to the arc, a resistance connected in series with both coils, the coils being so arranged that for an appreciable flow of current in a local circuit including the two coils, an appreciable potential drop results across the resistance, while when the arc current flows entirely through the load, no appreciable potential drop results.

6. In a radio frequency electrical system, means for producing high frequency oscillations by an arc, and means for insuring that the arc produces oscillations of substantially the required frequency, comprising a circuit paralleling a portion of the main path for the arc current, the extremities of the portion having a minimum potential difference when the frequency of the system is correct, the paralleling circuit including a resistance adjusted for the optimum result.

7. In a radio frequency electrical system, means for producing high frequency oscillations by a plurality of arcs arranged in parallel, and means for preventing cross currents between the arcs comprising a circuit in which the energy consumption varies an appreciable extent upon any tendency for cross currents to be established.

8. In a radio frequency electrical system, means for producing high frequency oscillations by a plurality of arcs arranged in parallel, and means for preventing cross currents between the arcs comprising a device capable of consuming electrical energy but so balanced by the arc currents that it consumes an increased amount of energy when cross currents attempt to flow.

9. In a radio frequency electrical system, a plurality of means for producing high frequency oscillations connected in parallel relation, and means for preventing cross currents between them comprising a circuit in which the energy consumption varies an appreciable extent upon any tendency for cross currents to be established.

10. In a ratio frequency electrical system, a plurality of means for producing high frequency oscillations connected in parallel relation, and means for preventing cross currents between them comprising a device capable of consuming electrical energy but so balanced by the currents in the parallel paths that it consumes an increased amount of energy when cross currents attempt to flow.

11. In a radio frequency electrical system, means for producing high frequency oscillations by a plurality of arcs arranged in parallel, a reactance in each of the arc paths, and means associated with the reactance to cause an appreciable energy loss when there is an appreciable cross current between the arcs.

12. In a radio frequency electrical system, a plurality of means for producing high frequency oscillations connected in parallel relation, an inductance coil in each of the parallel paths, and a resistance in series with these coils, the coils being so arranged that for appreciable cross currents between the means, the potential drop across the resistance is considerable, while when there is no cross current, no appreciable potential drop results.

13. In a radio frequency electrical system, a source of high frequency oscillations, a plurality of parallel paths for the current flowing through the load, and means for insuring that there be no cross currents in the parallel paths and for insuring that the frequency of the system remain that desired.

14. In a radio frequency electrical system, having a plurality of parallel paths for the current flowing through the load, means for insuring that there be no cross currents in the paths, comprising a reactance so arranged that it allows an appreciable amount of energy to be consumed when there are cross currents, but no appreciable amount when there are no cross currents, and means for insuring that the frequency of the system remain that desired.

15. In a radio frequency electrical system having a plurality of parallel paths for the current flowing through the load, means for producing high frequency oscillations by an arc in one of the parallel paths, means for insuring that there be no cross currents in the parallel paths, and means for insuring that the frequency of the system remain that desired.

16. In a radio frequency electrical system having a plurality of parallel paths for the current flowing through the load, means for producing high frequency oscillations by an arc in one of the parallel paths, means for insuring that there be no cross currents in the paths comprising a reactance so arranged that it allows an appreciable amount of energy to be consumed when there are cross currents, but no appreciable amount when there are no cross currents, and means for insuring that the frequency of the system remain that desired.

17. In a radio frequency electrical system, means for producing high frequency oscillations by a plurality of arcs arranged in parallel, means for insuring that there be no cross currents through the arcs, and means for insuring that the frequency at which the arcs operate remain that desired.

18. In a radio frequency electrical system, means for producing high frequency oscillations by a plurality of arcs arranged in parallel, means for insuring that there be no cross currents through the arcs comprising a reactance so arranged that it allows an appreciable amount of energy to be consumed when there are cross currents, but no appreciable amount when there are no cross currents, and means for insuring that the frequency of the system remain that desired.

19. In a radio frequency electrical system, means for producing high frequency oscillations by a plurality of arcs arranged in parallel, an induction coil located in each of the arc paths, these coils being so arranged that there is a considerable loss while there are cross currents between the arcs, but substantially none while there are no cross currents, an inductance and a capacity in series with each arc tuned to be resonant with the frequency which it is desired to maintain, and a resistance in each arc circuit paralleling the arc and the tuned circuit whereby upon a variation from the desired frequency, an appreciable potential difference results at the terminals of the resistance, as well as an energy loss through it.

20. In a radio frequency electrical system, means for producing high frequency oscillations by a plurality of arcs arranged in parallel, an inductance coil located in each of the arc paths, one on each side of and adjacent the point of junction of the two paths, said coils being so arranged that while all of the arc currents flow through the load, the potential drops across the coils are equal and opposed as measured in the local circuit including both arcs, an inductance and a capacity in series with each arc tuned to be resonant with the frequency which it is desired to maintain, and a resistance in each arc circuit paralleling the arc and the tuned circuit, these resistances also forming a path in parallel to the opposed inductive coils, whereby upon a variation from the desired frequency or upon the occasion of any cross currents between the arcs, an appreciable current flow results through at least one of the resistances.

21. In a radio frequency electrical system, a pair of arc converters arranged in parallel, and means for stabilizing the operation of the arcs, comprising a resistor, separate portions of said resistor paralleling each of the arcs, and the entire resistor connecting points in the two arc paths.

22. In a radio frequency electrical system, a pair of arc converters arranged in parallel, a reactance having separate portions in each of the parallel paths, and a resistor having separate portions paralleling each of the arc converters, said resistor being also connected across the reactance.

23. In a radio frequency electrical system, a pair of arc converters arranged in parallel, and means for stabilizing the system against frequency change and against cross currents, comprising an energy consuming device connected to the system in such manner as to have a minimum electromotive force impressed upon it only while the frequency is at a definite value and while no cross currents exist.

24. In a radio frequency electrical system, means for producing high frequency oscillations, and means for maintaining the frequency of the oscillations at a desired value comprising a circuit in which the quantity of energy consumed varies substantially upon a substantial change in either direction from the desired frequency.

25. In a radio frequency electrical system, means for producing high frequency oscillations, and a circuit so arranged that for a departure in either direction from the frequency desired, a substantial energy loss is produced in this circuit.

26. In a radio frequency electrical system having a plurality of parallel paths for the current flowing through the load, the method of maintaining the operation of the system stable which consists in increasing the amount of energy consumed in a portion of the system upon an appreciable flow of cross current between the parallel paths.

27. In a radio frequency electrical system, the method of maintaining the operation of the system at the required frequency which consists in increasing the amount of energy consumed in a portion of the system upon an appreciable variation in either direction from the desired frequency.

In testimony whereof, we have hereunto set our hands.

HAROLD F. ELLIOTT.
JAMES ARTHUR MILLER.